United States Patent
Brukwicz et al.

(10) Patent No.: US 7,830,151 B2
(45) Date of Patent: Nov. 9, 2010

(54) ELECTRONIC VOLTAGE SUPPLY METHOD AND APPARATUS

(75) Inventors: Leszek Brukwicz, Austin, TX (US); Ayedin Nikazm, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 769 days.

(21) Appl. No.: 11/772,112

(22) Filed: Jun. 29, 2007

(65) Prior Publication Data

US 2009/0001957 A1 Jan. 1, 2009

(51) Int. Cl.
- *G01N 27/416* (2006.01)
- *G05F 3/04* (2006.01)
- *G05F 1/00* (2006.01)
- *H05B 1/02* (2006.01)
- *H03K 17/72* (2006.01)

(52) U.S. Cl. ............ 324/426; 323/311; 323/223; 323/265; 323/349; 327/438; 327/531; 219/501

(58) Field of Classification Search .......... 324/426; 323/311

See application file for complete search history.

(56) References Cited

U.S. PATENT DOCUMENTS

| | | | |
|---|---|---|---|
| 5,680,300 A | 10/1997 | Szepesi et al. | |
| 5,886,424 A * | 3/1999 | Kim | 307/64 |
| 5,945,820 A | 8/1999 | Namgoong et al. | |
| 6,424,123 B1 * | 7/2002 | Odaohhara et al. | 320/134 |
| 6,717,458 B1 | 4/2004 | Potanin | |
| 6,835,491 B2 | 12/2004 | Gartstein et al. | |
| 2005/0160300 A1 * | 7/2005 | Nikazm et al. | 713/300 |
| 2006/0214649 A1 * | 9/2006 | Herzinger et al. | 323/282 |

* cited by examiner

*Primary Examiner*—Edward Tso
*Assistant Examiner*—Yalkew Fantu
(74) *Attorney, Agent, or Firm*—Garrana Tran, LLP

(57) ABSTRACT

A method and apparatus for supplying a voltage in an information handling system. A modulated voltage signal output circuit linked to an amplitude control element. The amplitude control element linked to a voltage output circuit, the output circuit including one or more electrical energy-storage elements to receive an electrical current. The voltage output circuit having one or more electronic switches to alter the current passing to the energy-storage element(s) to provide a modulated voltage output.

20 Claims, 3 Drawing Sheets

ELECTRONIC VOLTAGE SUPPLY METHOD AND APPARATUS

BACKGROUND

1. Technical Field

The present disclosure relates generally to the field of electronics. More specifically, but without limitation, the present disclosure relates to voltage supply circuits for information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The expanding use of electronic systems in applications requiring greater portability, lower power consumption, reduced cost, and less complexity presents a challenge for designers of these systems. Electronic systems have various voltage requirements depending on their configuration and operating designs. Conventional electronics often require voltages of differing parameters (e.g., amplitudes, frequencies, polarities) to perform the desired operations and functions. Thus a need remains for improved electronic circuit designs to provide and manipulate voltages.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides an apparatus for supplying a voltage in an information handling system, the apparatus comprising a modulated voltage signal output circuit and an amplitude control element linked to receive a modulated voltage signal from the modulated voltage signal output circuit. The apparatus further comprises a voltage output circuit linked to the amplitude control element and having at least one electrical energy-storage element to receive an electrical current, the voltage output circuit having at least one electronic switch to alter the current passing to the at least one energy-storage element, wherein the voltage output circuit provides a modulated output voltage.

Another aspect of the disclosure provides an apparatus for supplying a voltage in an information handling system, the apparatus comprising a modulated voltage signal output circuit and an amplitude control element linked to receive a modulated voltage signal from the modulated voltage signal output circuit. The apparatus further comprises a voltage output circuit linked to the amplitude control element, the voltage output circuit having at least one electrical energy-storage element to provide a higher voltage output compared to the input voltage and the voltage output circuit having an output for the modulated voltage.

Another aspect of the disclosure provides a method of supplying a voltage in an information handling system, the method comprising the steps of producing a voltage signal using a modulated voltage signal output circuit, receiving a modulated voltage signal from the modulated voltage signal output circuit at an amplitude control element linked to the modulated voltage signal output circuit, receiving an electric current from the amplitude control element at a voltage output circuit linked to the control element, the voltage output circuit having at least one electrical energy-storage element therein, altering the current passing to the at least one energy-storage element in the voltage output circuit using at least one electronic switch and outputting a modulated voltage from the voltage output circuit.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
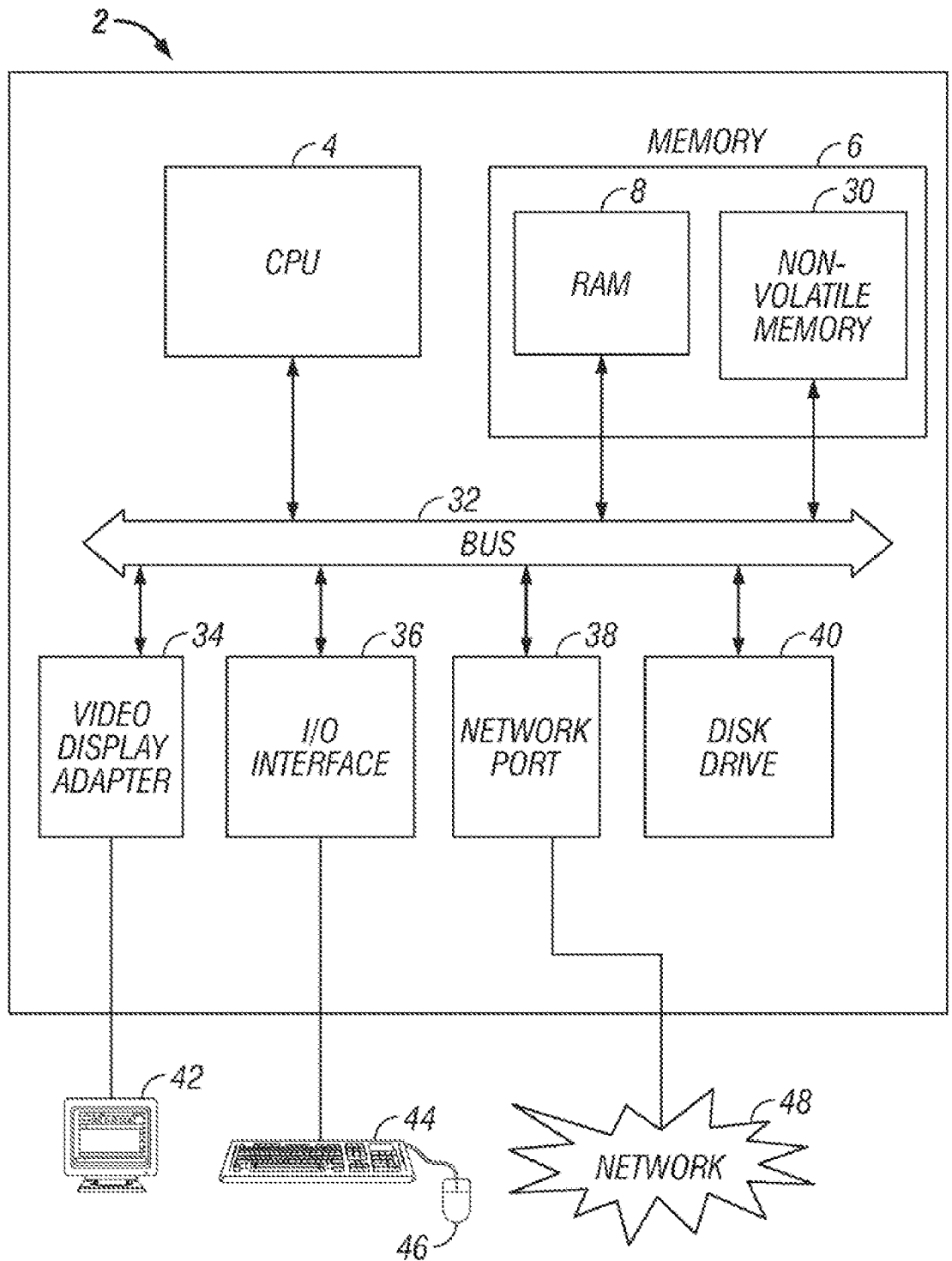
FIG. 1 shows a schematic an information handling system according to the present disclosure.

FIG. 1 illustrates one possible implementation of an IHS 2 comprising a CPU 4. It should be understood that the present disclosure has applicability to information handling systems as broadly described above, and is not intended to be limited to the IHS 2 as specifically described. The CPU 4 may comprise a processor, a microprocessor, minicomputer, or any other suitable device, including combinations and/or a plurality thereof, for executing programmed instructions. The CPU 4 may be in data communication over a local interface bus 32 with components including memory 6 and input/output interfaces 36. The memory 6, as illustrated, may include non-volatile memory 30. The non-volatile memory 30 may include, but is not limited to, firmware flash memory and electrically erasable programmable read-only memory (EEPROM). The firmware program (not shown) may contain, programming and/or executable instructions required to control a keyboard 44, mouse 46, video display 42 and/or other input/output devices not shown here. The memory may also comprise RAM 8. The operating system and application programs may be loaded into the RAM 8 for execution.

The IHS 2 may be implemented with a network port 38 to permit communication over a network 48 such as a local area network (LAN) or a wide area network (WAN), such as the Internet. As understood by those skilled in the art, IHS implementations may also include an assortment of ports and interfaces for different peripherals and components, such as video display adapters 34, disk drives port 40, and input/output interfaces 36 (e.g., keyboard, mouse).

Figure 2:
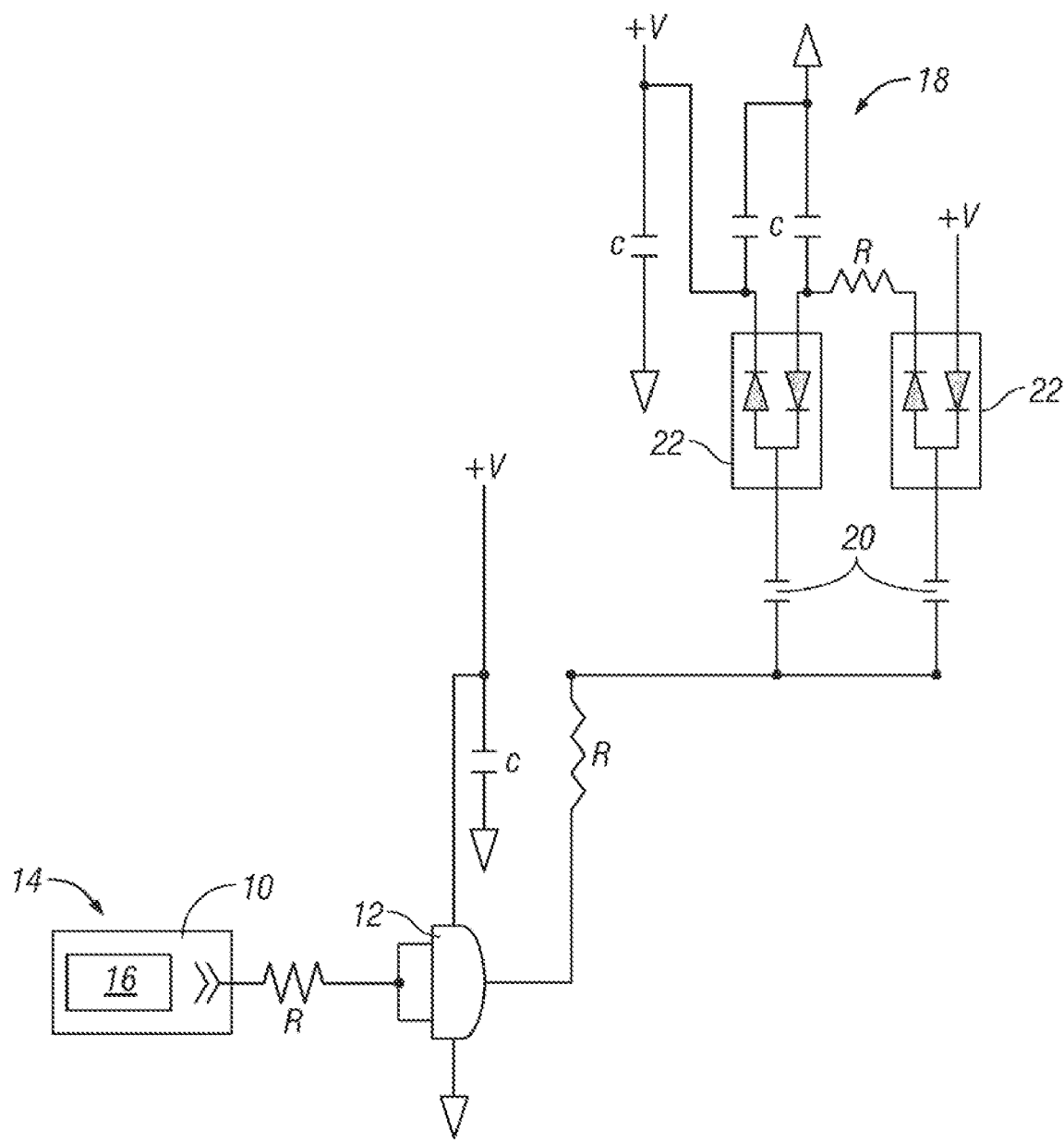
FIG. 2 shows an illustrative schematic of an electronic circuit configuration in accord with aspects of the disclosure.

FIG. 2 illustrates an aspect of the present disclosure. As shown schematically, a pulse-width modulated (PWM) voltage signal output circuit 10 is coupled to an amplitude control element 12. The PWM voltage signal output circuit 10 can be implemented using any conventional circuit design as known in the art, including digital circuits specifically configured to generate PWM signals. One aspect may be implemented using an embedded system (e.g., a keyboard controller) 14 within an IHS including a circuit component to provide the PWM voltage signal output.

Aspects of the voltage signal output circuit 10 may also include a clock or timing element 16 to provide a counter or clock signal to synchronize circuit operation and generate the modulated voltage signals. The timing element 16 may be connected directly or indirectly to the voltage signal output circuit 10. Any suitable timing element(s) may be used, including crystal oscillators, tank circuits, and other timing signal designs well known in the art.

As shown in the aspect of FIG. 2, the modulated voltage signal output from the (PWM) voltage signal output circuit 10 is linked to an amplitude control element 12, such as an AND gate logic device. The amplitude control element 12 is used to buffer the PWM signal to a desired voltage (e.g., 5-10 volts). Voltage input for the amplitude control element 12 may be provided via any voltage source(s) external to, or within, the embedded system 14. Aspects of the disclosure can be implemented with the PWM output signal buffered at different voltages, depending on the needed power supply. It will also be appreciated by those skilled in the art that aspects of the amplitude control element 12 can be implemented with various logic device configurations, for example, using NAND and OR gates in place of an AND gate.

Aspects of the present disclosure can be implemented with the PWM voltage signal output circuit 10 set to operate at a selected frequency or configured for programmable frequency output as known in the art. IHS configurations can be implemented with the PWM signal output frequency established by the BIOS configuration (not shown).

As shown in FIG. 2, the buffered PWM signal output from the amplitude control element 12 is input to a voltage output circuit 18. The voltage output circuit 18 is configured with one or more electrical energy-storage elements 20 (e.g., capacitors) to receive current flow from the control element 12 output and store a voltage charge. One or more electronic switches 22 may be linked to the voltage output circuit 18 to alter the current flow passing to the energy-storage element(s) 20. Aspects of the disclosure can be implemented using any suitable switching means to alter the current flow and thereby control the voltage reaching the energy-storage element(s) 20. FIG. 2 shows one aspect implemented using a series of diode switches to successively charge and discharge the energy-storage element(s) 20 according to the cycle or sequence established by the timing element 16. In essence, the voltage output circuit 18 is implemented as a charge pump.

As a charge pump, the voltage output circuit 18 uses the energy-storage element(s) 20 to create either a higher or lower voltage power source compared to the input voltage. For example, an aspect of the disclosure can be implemented to double the input voltage using the electronic switches 22 to control the voltage input to the energy-storage element(s) 20 to generate a higher voltage, with a first stage entailing the energy-storage element(s) 20 being coupled across a voltage and charged up. In a second stage, the energy-storage element(s) 20 may be uncoupled from the original charging voltage and re-coupled via the switches 22, with a negative terminal to the original positive charging voltage. Since the energy-storage element(s) 20 retains the voltage, the positive terminal voltage is added to the original, effectively doubling the voltage. Additional output capacitor(s) may be added to the voltage output circuit 18 to smooth the modulated voltage output. Other aspects may be implemented with output circuits 18 capable of high efficiencies, providing quadrupled or greater voltage outputs compared to the input voltage.

Figure 3:
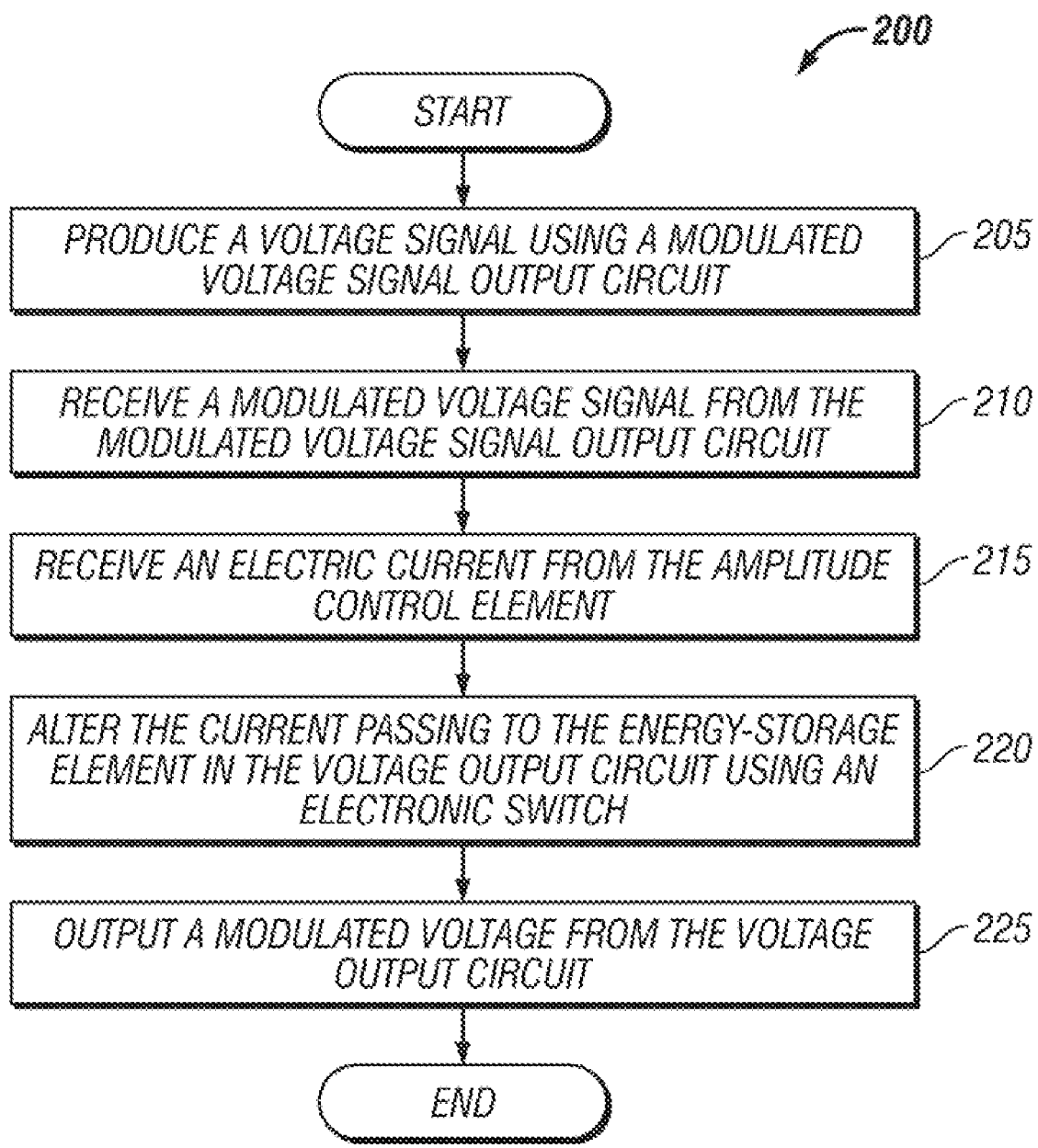
FIG. 3 shows a non-limiting flow chart of a method of supplying a voltage in an information handling system in accord with aspects of the disclosure.

FIG. 3 shows a flow chart of a method of supplying a voltage in an information handling system. In one aspect, a method 200 includes the use of a PWM voltage signal output circuit 10, as disclosed herein, to produce a modulated voltage signal output 205. The modulated voltage signal output is then received at an amplitude control element 12 linked to the modulated voltage signal output circuit 10 at step 210. A voltage output circuit 18, as disclosed herein, is linked to receive an electric current from the amplitude control element 12 at step 215. The voltage output circuit 18 is configured with one or more electrical energy-storage elements 20 as described herein. At step 220, one or more electronic switches 22 are used to alter the current passing to the energy-storage element(s) 20 in the voltage output circuit 18. A modulated voltage is output from the output circuit 18 at step 225. As disclosed herein, the output voltage may be at increased or decreased amplitude compared to the input voltage.

It will be appreciated by those skilled in the art that the electronic components/circuits and the signal paths linking the components of the disclosed aspects of the disclosure may be implemented via conventional means, including, but not limited to, printed circuits, mask works, digital circuits, analog circuits, or a combination thereof. While aspects are disclosed in relation to use with IHS implementations, the advantages provided by the disclosed disclosure (e.g., reduced size, reliability, higher efficiency) make it suitable for other applications such as subsurface exploration, space travel apparatus, underwater implementations, etc.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. An apparatus for supplying a voltage in an information handling system having a source of pulse width modulation (PWM) signals, the apparatus comprising:
   a modulated voltage signal output circuit responsive to said source of PWM signals;
   an amplitude control element linked to modify said PWM signals in the modulated voltage signal output circuit to output a timing signal; and
   a switched voltage output circuit linked to the amplitude control element and having at least one electrical energy-storage capacitor element to receive an electrical current at a first given voltage magnitude, the voltage output circuit having at least one electronic switch subject to said timing signal to alter the current passing to the at least one energy-storage capacitor element, whereby the voltage output circuit provides an output voltage which is of a magnitude different from said given voltage magnitude.

2. The apparatus of claim 1, wherein the modulated voltage signal output circuit comprises a timing element to provide a voltage at a desired frequency.

3. The apparatus of claim 2, wherein the amplitude control element comprises at least one logic gate.

4. The apparatus of claim 3, wherein the amplitude control element operates to buffer the amplitude of the voltage signal received from the modulated voltage signal output circuit to a desired voltage.

5. The apparatus of claim 4, wherein the at least one electrical energy-storage capacitor element is charged and discharged according to a sequence of the timing element.

6. The apparatus of claim 5, wherein the modulated voltage signal output circuit comprises a component of an embedded system in the information handling system.

7. The apparatus of claim 5, wherein the signal from the modulated voltage signal output circuit is programmable.

8. The apparatus of claim 5, wherein the voltage output circuit provides a higher voltage compared to the modulated voltage signal received from the modulated voltage signal output circuit.

9. The apparatus of claim 6, wherein the embedded system comprises a keyboard controller.

10. An apparatus for supplying a voltage in an information handling system having a source of pulse width modulation (PWM) signals, the apparatus comprising:
    a modulated voltage signal output circuit responsive to said source of PWM signals;
    an amplitude control element linked to receive a modulated voltage signal from the modulated voltage signal output circuit; and
    a switched voltage output circuit linked to the amplitude control element, the voltage output circuit having at least one electrical energy-storage capacitor element to provide a higher voltage output compared to the voltage output of the modulated voltage signal from the modulated voltage signal output circuit.

11. The apparatus of claim 10, wherein the modulated voltage signal output circuit comprises a timing element to provide a voltage at a desired frequency.

12. The apparatus of claim 11, wherein the at least one electrical energy-storage capacitor element is charged and discharged according to a sequence of the timing element.

13. The apparatus of claim 12, wherein the modulated voltage signal output circuit comprises a component of an embedded system in the information handling system.

14. A method of supplying a voltage in an information handling system having a source of pulse width modulation (PWM) signals, the method comprising:
    producing a voltage signal using a modulated voltage signal output circuit;
    modifying said PWM signals in the modulated voltage signal output circuit with an amplitude control element linked to the modulated voltage signal output circuit;
    receiving an electric current at a first given voltage magnitude from the amplitude control element at a switched voltage output circuit linked to the control element, the voltage output circuit having at least one electrical energy-storage capacitor element therein;
    altering the current passing to the at least one energy-storage capacitor element in the voltage output circuit using at least one electronic switch; and
    outputting a voltage from the voltage output circuit, whereby the modulated voltage is of a magnitude different from said given voltage magnitude.

15. The method according to claim 14, further comprising timing the modulated voltage signal output circuit to provide a voltage at a desired frequency.

16. The method according to claim 15, further comprising buffering the amplitude of the voltage signal output from the modulated voltage signal output circuit to a desired voltage.

17. The method according to claim 15, further comprising charging and discharging the at least one electrical energy-storage capacitor element according to a timed sequence.

18. The method according to claim 14, further comprising programming the modulated voltage signal output circuit to produce a desired signal.

19. The method according to claim 17, further comprising providing a higher voltage at the voltage output circuit compared to the voltage signal received from the modulated voltage signal output circuit.

20. The method according to claim 14, wherein producing a voltage signal using a modulated voltage signal output circuit comprises using a keyboard controller in the information handling system.

* * * * *